United States Patent
Oono

(10) Patent No.: US 9,090,015 B2
(45) Date of Patent: Jul. 28, 2015

(54) CONTROLLER OF INJECTION MOLDING MACHINE

(71) Applicant: Fanuc Corporation, Yamanashi (JP)

(72) Inventor: Hajime Oono, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/195,696

(22) Filed: Mar. 3, 2014

(65) Prior Publication Data

US 2014/0248386 A1  Sep. 4, 2014

(30) Foreign Application Priority Data

Mar. 4, 2013  (JP) .................................. 2013-042234

(51) Int. Cl.
*B29C 45/77* (2006.01)

(52) U.S. Cl.
CPC ....... *B29C 45/77* (2013.01); *B29C 2945/76083* (2013.01); *B29C 2945/76187* (2013.01); *B29C 2945/76367* (2013.01); *B29C 2945/76568* (2013.01); *B29C 2945/76665* (2013.01); *B29C 2945/76846* (2013.01); *B29C 2945/76882* (2013.01); *B29C 2945/76943* (2013.01)

(58) Field of Classification Search
CPC ...................... B29C 45/77; B29C 2945/76083; B29C 2945/76187; B29C 2945/76367; B29C 2945/76568; B29C 2945/76665
USPC ................................................ 425/145, 150
See application file for complete search history.

(56) References Cited

U.S. PATENT DOCUMENTS

| | | | |
|---|---|---|---|
| 2004/0091561 A1* | 5/2004 | Uchiyama et al. | 425/145 |
| 2004/0142056 A1* | 7/2004 | Watanabe et al. | 425/145 |
| 2006/0216370 A1 | 9/2006 | Uchiyama et al. | |
| 2008/0152748 A1* | 6/2008 | Takatsugi et al. | 425/147 |
| 2008/0305201 A1 | 12/2008 | Maruyama et al. | |
| 2011/0018156 A1* | 1/2011 | Yamada | 264/40.1 |
| 2014/0113038 A1* | 4/2014 | Holt et al. | 426/231 |

FOREIGN PATENT DOCUMENTS

| | | |
|---|---|---|
| JP | H07-9514 A | 1/1995 |
| JP | 8290448 A | 11/1996 |
| JP | 200025080 A | 1/2000 |
| JP | 2006272646 A | 10/2006 |
| JP | 2008302527 A | 12/2008 |

OTHER PUBLICATIONS

Office Action mailed Jul. 29, 2014, corresponding to Japanese patent application No. 2014-039547.
Notification of Reasons for Refusal dated Dec. 24, 2014 in corresponding JP Application No. 2014-039547, 7 pages.

* cited by examiner

*Primary Examiner* — Tim Heitbrink
(74) *Attorney, Agent, or Firm* — Lowe Hauptman & Ham, LLP

(57) ABSTRACT

In an injection molding machine provided with an injection member (injection screw or plunger) having a check valve, a process position of the injection member such as a metering completion position or an injection speed switching position is changed at every predetermined cycle. Thus, it is possible to periodically change a position inside a cylinder which is easy to wear and to reduce the frequency of performing the maintenance of a purging or disassembling and cleaning.

5 Claims, 6 Drawing Sheets

METERING POSITION

INJECTION SPEED SWITCHING POSITION

INJECTION HOLD-PRESSURE SWITCHING POSITION

CONTROLLER OF INJECTION MOLDING MACHINE

RELATED APPLICATIONS

The present application claims priority to Japanese Application Number 2013-042234, filed Mar. 4, 2013, the disclosure of which is hereby incorporated by reference herein in its entirety.

BACKGROUND OF THE INVENTION

1. Field of the Invention

The present invention relates to an injection molding machine, and more particularly, to a controller of the injection molding machine which controls a process position of an injection member in the injection molding machine at every predetermined cycle.

2. Description of the Related Art

An injection molding machine M, as illustrated in FIG. 1, includes a mold clamping section Mc and an injection section Mi on a machine base. The mold clamping section Mc opens and closes a mold 40 (movable-side mold 40a and stationary-side mold 40b). The injection section Mi heats and melts a resin material (pellet) and injects the molten resin into a cavity of the mold 40.

First, the mold clamping section Mc will be described. The mold clamping section Mc is made up of a movable platen 30, a rear platen 31, a toggle 32, a stationary platen 33, a cross head 34, a mold clamping servo motor M3 which is configured to move the movable platen 30 backward and forward, a servo motor M4 which is configured to push out an ejector pin for ejecting a molded article from the mold, and a ball screw shaft 38 which is driven by the mold clamping servo motor M3. The stationary platen 33 is fixed onto a machine base. The stationary platen 33 and the rear platen 31 are connected to each other by a plurality of tie bars 41. The movable platen 30 is disposed to move (backward and forward) along the tie bars 41 between the stationary platen 33 and the rear platen 31 by an operation of the toggle 32.

The movable-side mold 40a is attached to the movable platen 30, and the stationary-side mold 40b is attached to the stationary platen 33. The mold 40 is configured by the movable-side mold 40a and the stationary-side mold 40b. The ball screw shaft 38 is driven by the mold clamping servo motor M3, the cross head 34 attached to the ball screw shaft 38 moves backward and forward, and thus a position of the movable platen 30 can be changed. In this case, when the cross head 34 moves forward (moves to the right direction in FIG. 1), the movable platen 30 moves forward through the toggle 32 and thus the mold is closed. Then, a mold clamping force is generated by multiplying an impellent force due to the mold clamping servo motor M3 by toggle magnification, and the mold clamping is performed by the generated mold clamping force.

Next, the injection section Mi will be described. A nozzle 12 is attached to the leading end of an injection cylinder portion 10, and a screw 1 is inserted into a cylinder 5 of the injection cylinder portion 10. The screw 1 is rotated by a screw rotating servo motor M2 and moved in an axial direction of the screw 1 by a screw moving back and forth servo motor M1. Further, reference numeral 14 denotes a hopper which supplies resin to the cylinder 5. FIG. 1 illustrates a state where the injection nozzle 12 of the leading end of the injection cylinder portion 10 in the injection section Mi is closely contacted with a resin injection port of the stationary platen 33. In this state, a resin melted by the rotation of the screw 1 is injected into the mold 40 (movable-side mold 40a and stationary-side mold 40b) by a forward movement of the screw 1.

A molding operation using the injection molding machine M will be described. When the mold clamping servo motor M3 rotates in a normal direction, the ball screw shaft 38 rotates in the normal direction, and the cross head 34, which is engaged with the ball screw shaft 38 by the screw, moves forward (to the right direction in FIG. 1). Then, the toggle 32 is actuated and the movable platen 30 moves forward.

When the movable-side mold 40a attached to the movable platen 30 comes in contact with the stationary-side mold 40b attached to the stationary platen 33 (a state in which the mold is closed), a mold clamping process is started. In the mold clamping process, when the mold clamping servo motor M3 is further driven in the normal direction, the mold clamping force is generated in the mold 40. Then, when the screw moving back and forth servo motor M1 provided in the injection section Mi is driven and the screw 1 moves forward in the axial direction, the molten resin is filled in a cavity space which is formed in the mold 40 (movable-side mold 40a and stationary-side mold 40b).

When the mold opening process is performed, the mold clamping servo motor M3 is driven in a reverse direction to rotate the ball screw shaft 38 in the reverse direction. Accordingly, the cross head 34 moves backward, and the movable platen 30 moves (backward) in a direction approaching the rear platen 31. When the mold opening process is completed, the servo motor M4 is actuated to push out the ejector pin (not illustrated) for ejecting the molded article from the movable-side mold 40a. Thus, the ejector pin is pushed out from an inner surface of the movable-side mold 40a, and the molded article within the movable-side mold 40a is pushed out from the movable-side mold 40a.

In the injection cylinder portion 10, the screw 1 is rotated by the screw rotating servo motor M2 to melt the resin, and thus the molten resin is fed forward. Then, the screw 1 moves backward by being rotated with this resin pressure by the screw moving back and forth servo motor M1 to perform a metering. Thereafter, the screw 1 moves forward by the screw moving back and forth servo motor M1 to inject the molten resin into the mold 40. In order to prevent a backflow of the resin during the injection, a check valve 3 is provided at the leading end of the screw 1.

The injection cylinder portion 10 in the injection molding machine M will be described with reference to FIG. 2.

The screw 1 is inserted into the cylinder 5, and a screw head 2, the check valve 3, and a check seat 4 are provided at the leading end of the screw 1. The check valve 3 is disposed to be movable in the axial direction of the screw 1 to a reduced diameter portion between body portions of the screw 1. The check seat 4 is formed in the reduced diameter portion of the leading end of the screw 1, provided on the side of the body of the screw, to come in close contact with the check valve 3 and to close a resin passage.

In a metering process, the screw 1 rotates, and the resin pellet supplied from the back side of screw 1 is melted by shearing heat generated by the rotation of the screw 1 and heat from a heater (not illustrated) provided at an outside of the cylinder 5 into which the screw 1 is inserted. The molten resin raises the resin pressure at a rear of the check valve 3 to generate a force for pushing the check valve 3 forward. When the check valve 3 is pushed forward, the resin of a rear screw compression portion 6 is fed to the front of the check valve 3 through a gap between the check valve 3 and the reduced diameter portion of the leading end of the screw to raise a pressure in the cylinder 5 ahead of the screw head 2.

When the resin pressure at the front of the check valve 3 exceeds a predetermined pressure, the screw 1 is pushed backward and thus the pressure at the front of the check valve 3 is reduced. Since the pressure at the rear of the check valve 3 is higher than the pressure at the front of the check valve 3 as the screw 1 further rotates, the continuously melted resin is fed to the front of the check valve 3. When the screw 1 moves backward to a predetermined range, the rotation of the screw is stopped and the metering process is completed.

Next, an injection process is started. When the screw 1 moves forward to fill the resin in the mold 40, the pressure of resin accumulated in the front of the screw head 2 rises. Thus, the check valve 3 moves backward and comes in close contact with the check seat 4 to close the resin passage to prevent the backflow of the molten resin in a backward direction of the screw 1.

The backflow of the resin occurs toward the back side from the front side of the check valve 3 until the resin passage is closed by the check valve 3 after the injection is started. The backflow occurs in the resin passage, but may also occur in a gap formed by a difference between an outer diameter of the check valve 3 and an inner diameter of the cylinder 5. When the injection molding machine is continuously used for a long time, the check valve 3 and the cylinder 5 are worn out and the amount of backflow is varied. Since the amount of backflow has an influence on the amount of resin filled in the mold, the quality of the molded article is influenced by the amount of backflow.

Further, in the compression portion 6 of the screw, the inside of the cylinder 5 is sometimes deposited with contaminants such as color additives or resin burning. The presence of the contaminants also has an influence on the quality of the molded article. In order to remove the contaminants from the inside of the cylinder 5, it is necessary to purge with a detergent or to disassemble and clean the injection cylinder portion 10, and thus costs and man-hours are required.

Japanese Patent Application Laid-Open No. 2008-302527 discloses the facts that when an injection molding machine is continuously used, a check valve and the inner wall of a cylinder are worn out, the backflow of resin occurring toward the back side from the front side of the check valve is increased, and the backflow of resin has an influence on the amount of resin filled in a mold and on the quality of a molded article. Further, the above-mentioned patent document discloses, as a measure of such influence, a technique which detects a screw rotation force due to backflow of resin occurring toward the back side from the front side of the check valve and estimates the worn state of the check valve by a change in physical quantities such as a magnitude of a peak value of the screw rotation force, a time point of peak appearance, a position of the screw at that time or the like.

According to the technique disclosed in the above-mentioned patent document, by detecting the screw rotation force due to the backflow of resin, it is possible to calculate a progression of the worn state of the check valve or the like up to the present date and predict a future progression of wear from the estimation result, but the above-mentioned patent document does not specifically disclose the way of reducing the wear amount.

SUMMARY OF THE INVENTION

An object of the invention is to provide a controller of an injection molding machine provided with an injection member which can reduce the frequency of performing maintenance of purging or disassembling and cleaning of the injection molding machine to improve productivity and to extend the life of a cylinder which has been replaced by local wear.

According to the invention, in an injection section of the injection molding machine, a position inside the cylinder which is easy to wear is periodically changed by periodically correcting a metering completion position or an injection speed switching position, and thus the frequency of performing the maintenance of purging or disassembling and cleaning of the injection molding machine can be reduced to improve the productivity and to extend the life of the cylinder. Further, contaminants are deposited on a specific place inside the cylinder in the related art, but in the invention, a position, to which a compression portion of the screw inside the cylinder comes close, can be changed by periodically correcting the metering completion position to expand the position of the cylinder relative to the compression portion of the screw, and thus it is possible to extend the length of time up to the deposition of the contaminants.

In the controller of the injection molding machine according the invention, the injection molding machine is provided with the injection member, and the controller controls the injection molding machine to perform metering and plasticization of a resin up to a metering completion position in a metering process, to move the injection member forward while switching an injection speed at an injection speed switching position in an injection process, and to proceed to a hold pressure process when a predetermined injection hold-pressure switching condition is satisfied. The controller includes: an injection member position setting unit that sets a process value with respect to a process position of the injection member and sets the process position of the injection member according to the set process value; and a correction value setting unit that sets a correction value to correct the process position of the injection member. Then, the injection member position setting unit sets the metering completion position and the injection speed switching position as the process position of the injection member, at every predetermined cycle, using the correction value.

The process position of the injection member is a control target value comprehensively indicating the metering completion position, the injection speed switching position, and the injection hold-pressure switching position. The process value is a parameter for determining an actual process position.

According to the controller of the injection molding machine of the invention, since the process position of the injection member such as the metering completion position or the injection speed switching position can be changed at every predetermined cycle, the position inside the cylinder which is easy to wear is periodically changed and thus the frequency of performing the maintenance of purging or disassembling and cleaning of the injection molding machine can be reduced to improve the productivity and to extend the life of the cylinder.

The injection hold-pressure switching condition may be determined based on the position of the injection member, and the injection member position setting unit further may set an injection hold-pressure switching position as the process position of the injection member, using the correction value.

According to the above embodiment, when the injection hold-pressure switching condition is determined by the position of the injection member, the injection hold-pressure switching position, in addition to the metering completion position and the injection speed switching position, is also further set using the correction value. Thus, even when the metering completion position is changed, the injection hold-pressure switching position is also changed at the corresponding position and thus there is no possibility that the amount of resin injected into the mold is changed.

The injection member position setting unit may read out the correction value at every predetermined cycle and obtain a new process value by adding or subtracting the read correction value to or from the process value to set the process position of the injection member based on the new process value.

According to the above embodiment, the process value as a numerical value indicating the process position of the injection member is set, the process value is replaced with the new process value by adding or subtracting the correction value to or from the process value at every predetermined cycle, and the new process position of the injection member is set based on the new process value.

The correction value setting unit may set a correction value corresponding to the number of cycles to set the process position of the injection member based on a result obtained by adding or subtracting the read correction value to or from the process value.

The predetermined number of cycles may be the number of cycles stored previously in a storage device or the number of cycles input from an input unit.

According to the invention, it is possible to provide the controller of the injection molding machine with the injection member which can reduce the frequency of performing the maintenance of purging or disassembling and cleaning of the injection molding machine to improve productivity and to extend the life of the cylinder which has been replaced by the local wear.

In the invention, the injection member of the injection molding machine can be either of a screw or a plunger.

BRIEF DESCRIPTION OF THE DRAWINGS

The above and other objects and features of the present invention will be apparent from the following description of embodiments with reference to the accompanying drawings, in which.

DETAILED DESCRIPTION OF THE PREFERRED EMBODIMENTS

In the invention, a process position of a screw such as a metering completion position or a speed switching position is adjusted at every predetermined cycle in an injection cylinder portion of an injection molding machine.

Hereinafter, an embodiment of the invention will be described with reference to the drawings.

Figure 1:
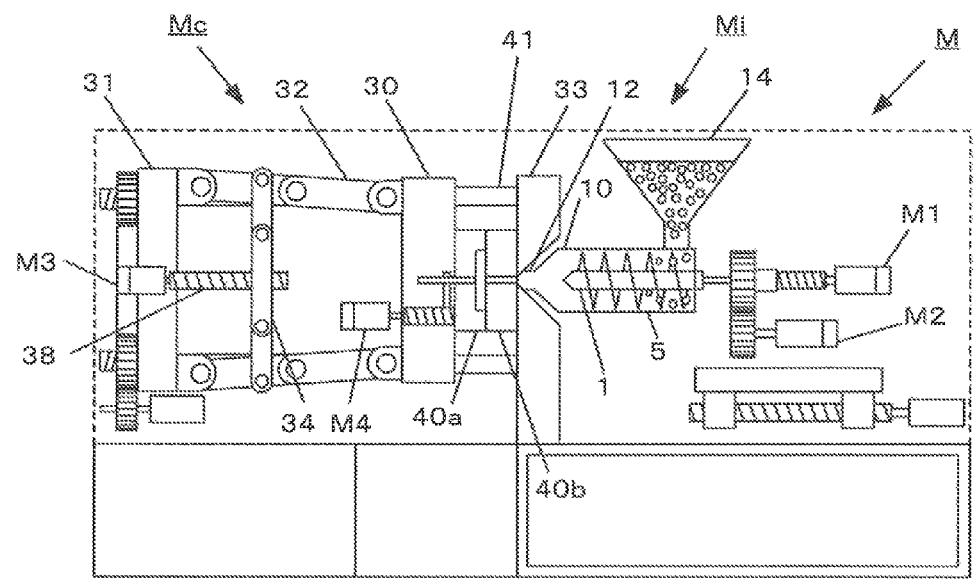
FIG. 1 is a diagram illustrating an overall configuration of an injection molding machine.
Figure 2:
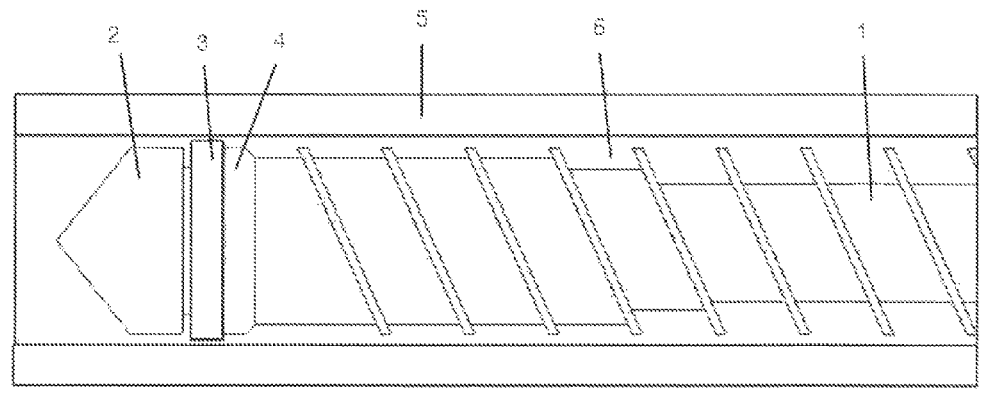
FIG. 2 is an enlarged diagram of an injection cylinder portion of the injection molding machine illustrated in FIG. 1.

As an injection molding machine to be controlled by the controller according to the invention and an injection cylinder portion provided in the injection molding machine, an injection molding machine and an injection cylinder portion similar to the prior art as illustrated in FIGS. 1 and 2 are used.

Figure 3A:
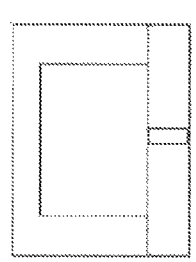
FIGS. 3A to 3C are diagrams illustrating an injection process in the injection cylinder portion of the injection molding machine illustrated in FIG. 1, respectively.
Figure 3A:
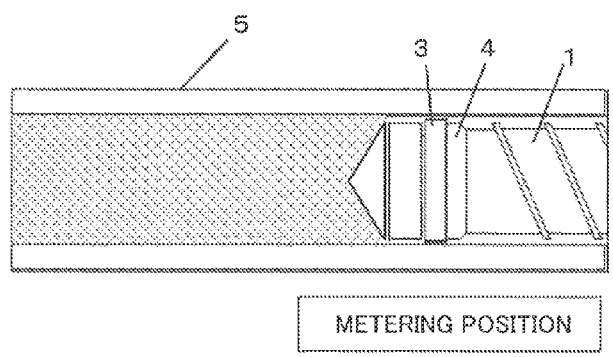
Figure 3B:
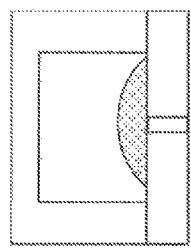
Figure 3B:
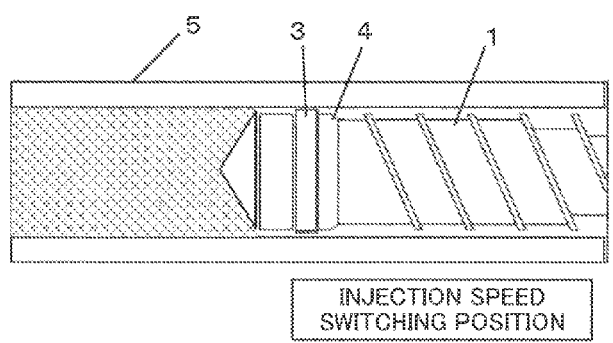
Figure 3C:
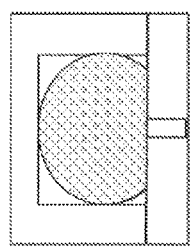
Figure 3C:
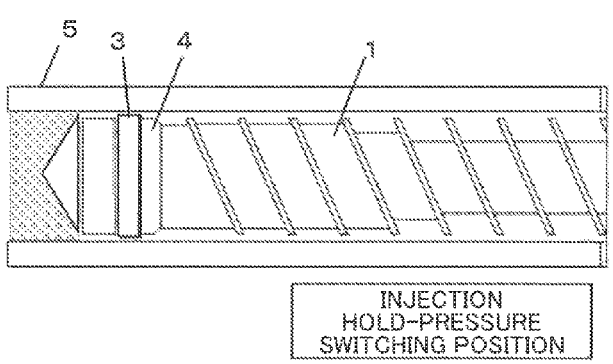

FIGS. 3A to 3C are diagrams illustrating an injection process in an injection cylinder portion 10, respectively. FIG. 3A illustrates a metering completion position, and a certain amount of resin between the metering completion position and a leading end of a cylinder 5 is metered. After the metering completion, an injection process is performed, and the screw 1 moves forward inside the cylinder 5. FIG. 3B is a diagram illustrating an injection speed switching position for changing a forward speed of the screw 1 at the position in the course of a forward movement of the screw 1. FIG. 3C is a diagram illustrating an injection hold-pressure switching position for switching to an injection hold-pressure state when the forward movement of the screw 1 is completed.

Here, a screw process value that increases as the screw 1 moves backward, with the value indicating a position of a forward end of the screw 1 being zero, is assumed here. Regarding these screw process values, a screw process value (metering completion value) indicating the metering completion position is set to Xm, and a screw process value (injection speed switching value) indicating the injection speed switching position is set to Xv. These metering completion value Xm and injection speed switching value Xv are stored in a storage device.

In addition, as a lower limit value Xmin of the metering completion value Xm, an amount of movement of the screw from the metering completion position to the most forward position of the screw in the injection/hold-pressure process is usually set. An upper limit value Xmax of the metering completion value Xm may be input as a molding condition, or may be a value stored previously in the storage device or may be a movable upper limit value of the injection molding machine.

Figure 4:
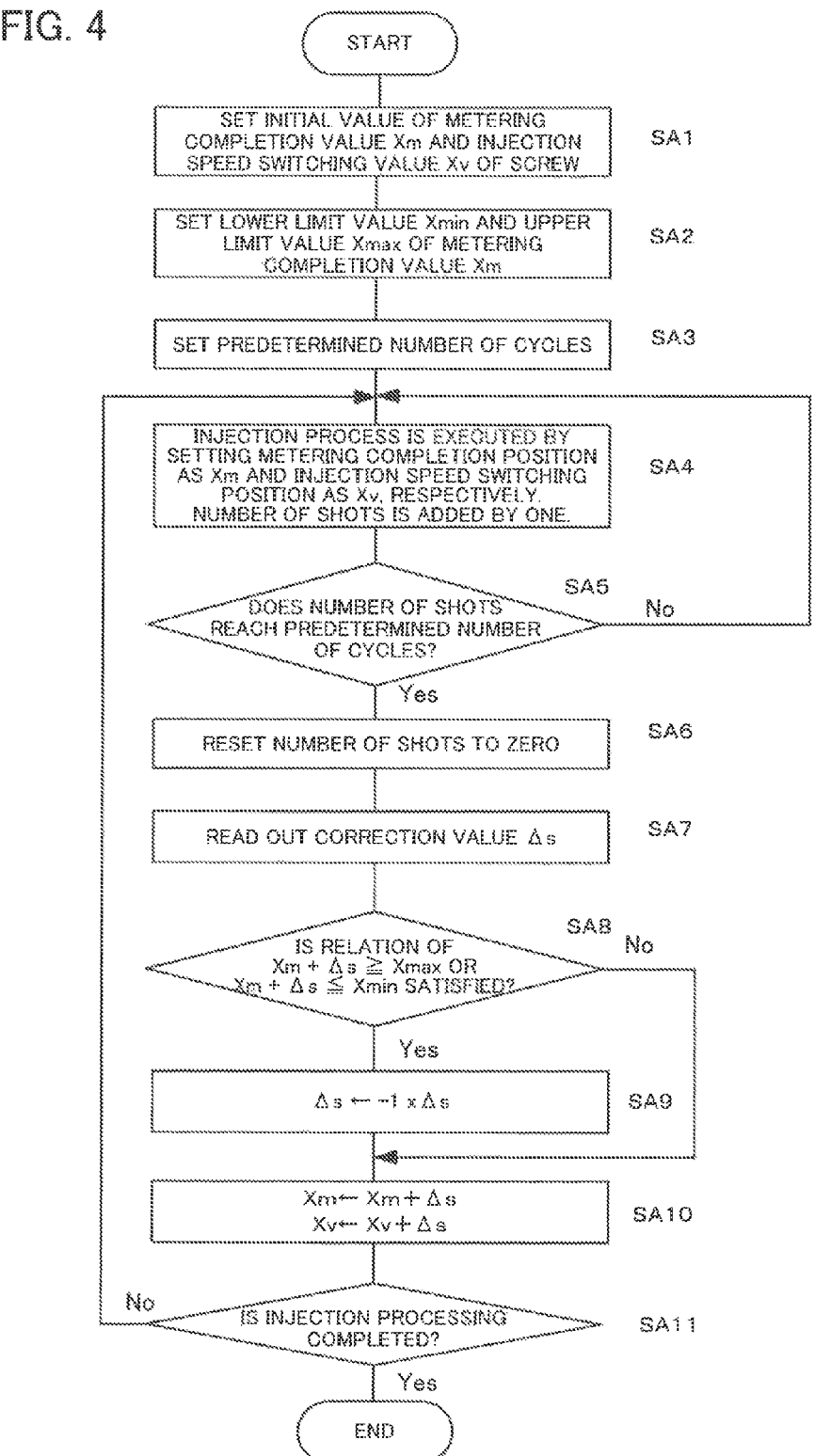
FIG. 4 is a flowchart illustrating a first example of correction processing of screw process values which is executed by a controller of the injection molding machine according to the invention.

First, a first example of correction processing of the screw process value will be described with reference to a flowchart of FIG. 4. In this example, the screw process values as a correction target are the metering completion value Xm and the injection speed switching value Xv.

In step SA1, an initial value of the metering completion value Xm indicating a metering completion position and an initial value of the injection speed switching value Xv indicating the injection speed switching position are set.

In step SA2, a lower limit value Xmin and an upper limit value Xmax of the metering completion value Xm are set.

In step SA3, the predetermined number of cycles is set.

In step SA4, the metering completion position is set to a position of the screw process value Xm and the injection speed switching position is set to a position of the screw process value Xv, and then the injection process is executed. When predetermined injection hold-pressure switching conditions such as a value of an internal pressure or time that elapses from the start of the injection process are satisfied, a hold pressure process is executed. Moreover, the number of shots is added by one.

In step SA5, it is determined whether or not the number of shots reaches the predetermined number of cycles which is set in step SA3. When the number of shots reaches the predetermined number of cycles (YES), the processing proceeds to step SA6; and when the number of shots does not reach the predetermined number of cycles (NO), the processing returns to step SA4.

In step SA6, the number of shots is reset to zero.

In step SA7, a correction value Δs is read out.

In step SA8, it is determined whether the relation of Xm+Δs≥Xmax or Xm+Δs≤Xmin is satisfied or not; that is, it is determined whether, when the correction value Δs is added to the metering completion value Xm, a position of the screw corresponding to a metering completion value Xm obtained by the aforementioned addition falls within a predetermined range or not. When the position of the screw is within the predetermined range (YES), the processing proceeds to step SA9; and when the position of the screw is not within the predetermined range (NO), the processing proceeds to step SA10.

In step SA9, a sign of the correction value Δs is inverted.

In step SA10, the correction value Δs is each added to the screw metering completion value Xm and the injection speed switching value Xv to newly obtain a screw metering completion value Xm and an injection speed switching value Xv, respectively.

In step SA11, it is determined whether the injection process is completed or not. When the injection process is completed (YES), the processing is terminated; and when the injection process is not completed (NO), the processing returns to step SA4.

Figure 5:
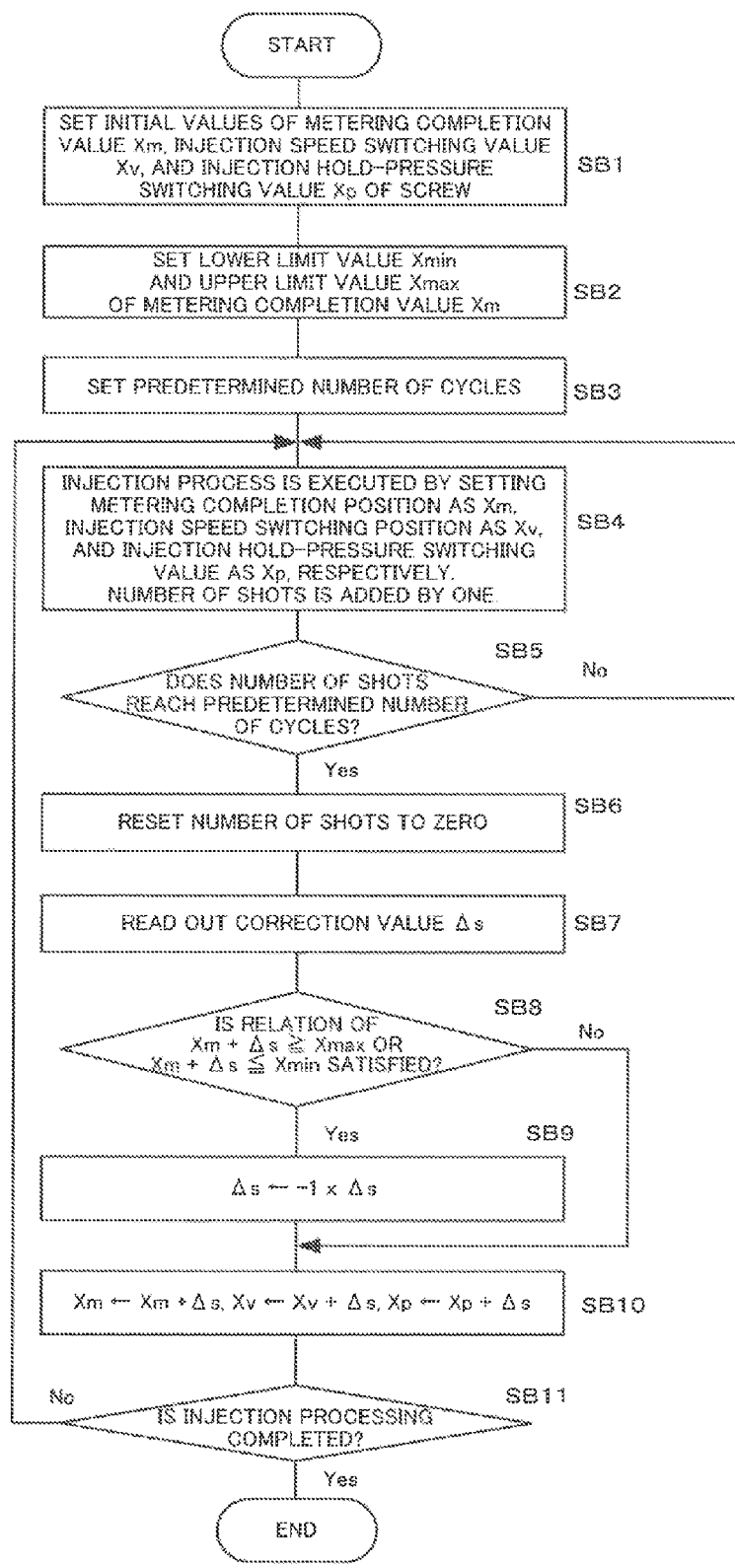
FIG. 5 is a flowchart illustrating a second example of correction processing of the screw process values which is executed by the controller of the injection molding machine according to the invention.

Next, a second example of correction processing of the screw process value will be described with reference to a flowchart of FIG. 5. In this example, the screw process values as a correction target are the metering completion value Xm, the injection speed switching value Xv, and the injection hold-pressure switching value Xp.

In step SB1, an initial value of the metering completion value Xm indicating the metering completion position, an initial value of the injection speed switching value Xv indicating the injection speed switching position, and an initial value of the injection hold-pressure switching value Xp indicating the injection hold-pressure switching position are set.

In step SB2, a lower limit value Xmin and an upper limit value Xmax of the metering completion value Xm are set.

In step SB3, the predetermined number of cycles is set.

In step SB4, the metering completion position is set to a position of the screw process value Xm and the injection speed switching position is set to a position of the screw process value Xv, and then the injection process is executed. Further, the injection hold-pressure switching position is set to a position of the screw process value Xp, and when the screw is moved to the position of the screw process value Xp, the hold pressure process is executed. Moreover, the number of shots is added by one.

In step SB5, it is determined whether or not the number of shots reaches the predetermined number of cycles which is set in step SB3. When the number of shots reaches the predetermined number of cycles (YES), the processing proceeds to step SB6; and when the number of shots does not reach the predetermined number of cycles (NO), the processing returns to step SB4.

In step SB6, the number of shots is reset to zero.

In step SB7, a correction value Δs is read out.

In step SB8, it is determined whether the relation of Xm+Δs≥Xmax or Xm+Δs≤Xmin is satisfied or not; that is, it is determined whether, when the correction value Δs is added to the metering completion value Xm, a position of the screw corresponding to a metering completion value Xm obtained by the aforementioned addition falls within a predetermined range or not. When the position of the screw is within the predetermined range (YES), the processing proceeds to step SB9; and when the position of the screw is not within the predetermined range (NO), the processing proceeds to step SB10.

In step SB9, a sign of the correction value Δs is inverted.

In step SB10, the correction value Δs is each added to the metering completion value Xm, the injection speed switching value Xv, and the injection hold-pressure switching value Xp to newly obtain a screw metering completion value Xm, an injection speed switching value Xv, and an injection hold-pressure switching value Xp, respectively.

In step SB11, it is determined whether the injection process is completed or not. When the injection process is completed (YES), the processing is terminated; and when the injection process is not completed (NO), the processing returns to step SB4.

Figure 6:
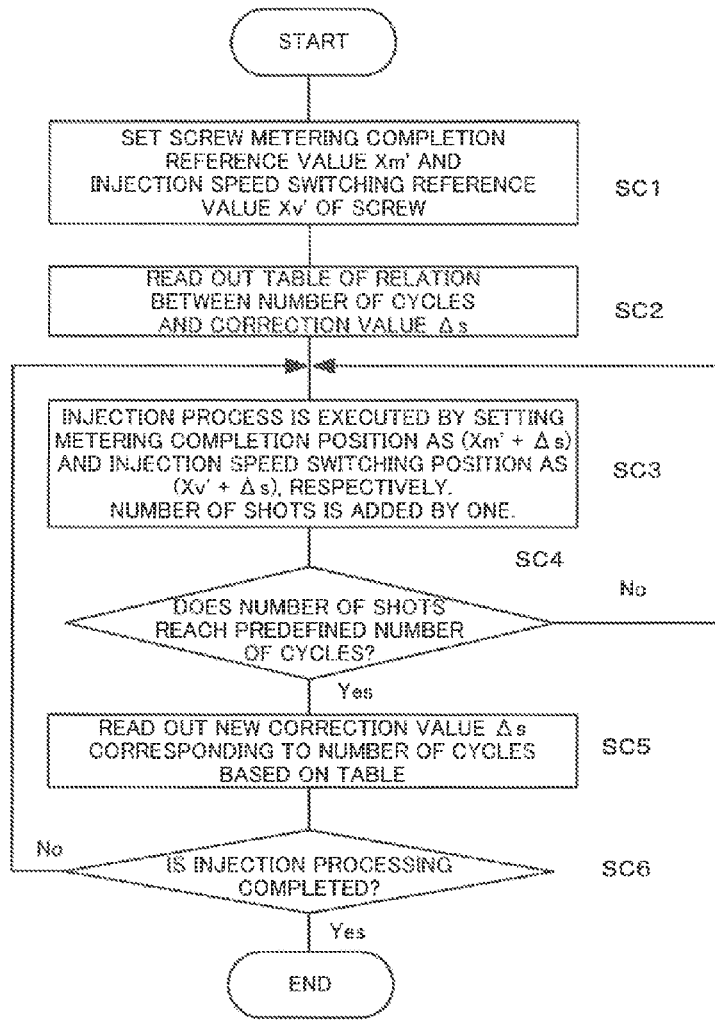
FIG. 6 is a flowchart illustrating a third example of correction processing of the screw process values which is executed by the controller of the injection molding machine according to the invention.

Next, a third example of correction processing of the screw process value will be described with reference to a flowchart of FIG. 6. In this example, the screw process values as a correction target are a metering completion reference value Xm' and an injection speed switching reference value Xv', a correction value Δs corresponding to the number of cycles is read out without changing these metering completion reference value Xm' and injection speed switching reference value Xv', and the correction value Δs is each added to the metering completion reference value Xm' and the injection speed switching reference value Xv'. Using the values obtained by the aforementioned addition, a screw metering completion position and an injection speed switching position are set.

In step SC1, a screw metering completion reference value Xm' indicating a reference position of a screw metering completion and the injection speed switching reference value Xv' indicating a reference position of an injection speed switching are set.

In step SC2, a table of a relation between the number of cycles and the correction value Δs is read out.

In step SC3, the metering completion position is set to a position of the screw process value (Xm'+Δs) and the injection speed switching position is set to a position of the screw process value (Xv'+Δs), then the injection process is executed. When predetermined injection hold-pressure switching conditions such as a value of an internal pressure or time that elapses from the start of the injection process are satisfied, a hold pressure process is executed. Moreover, the number of shots is added by one.

In step SC4, it is determined whether or not the number of shots reaches the predetermined number of cycles which is defined in the table of step SC2. When the number of shots reaches the predetermined number of cycles (YES), the processing proceeds to step SC5; and when the number of shots does not reach the predetermined number of cycles (NO), the processing returns to step SC3.

In step SC5, the correction value Δs corresponding to the number of cycles is newly read out based on the table.

In step SC6, it is determined whether the injection process is completed or not. When the injection process is completed (YES), the processing is terminated; and when the injection process is not completed (NO), the processing returns to step SC3.

Figure 7:
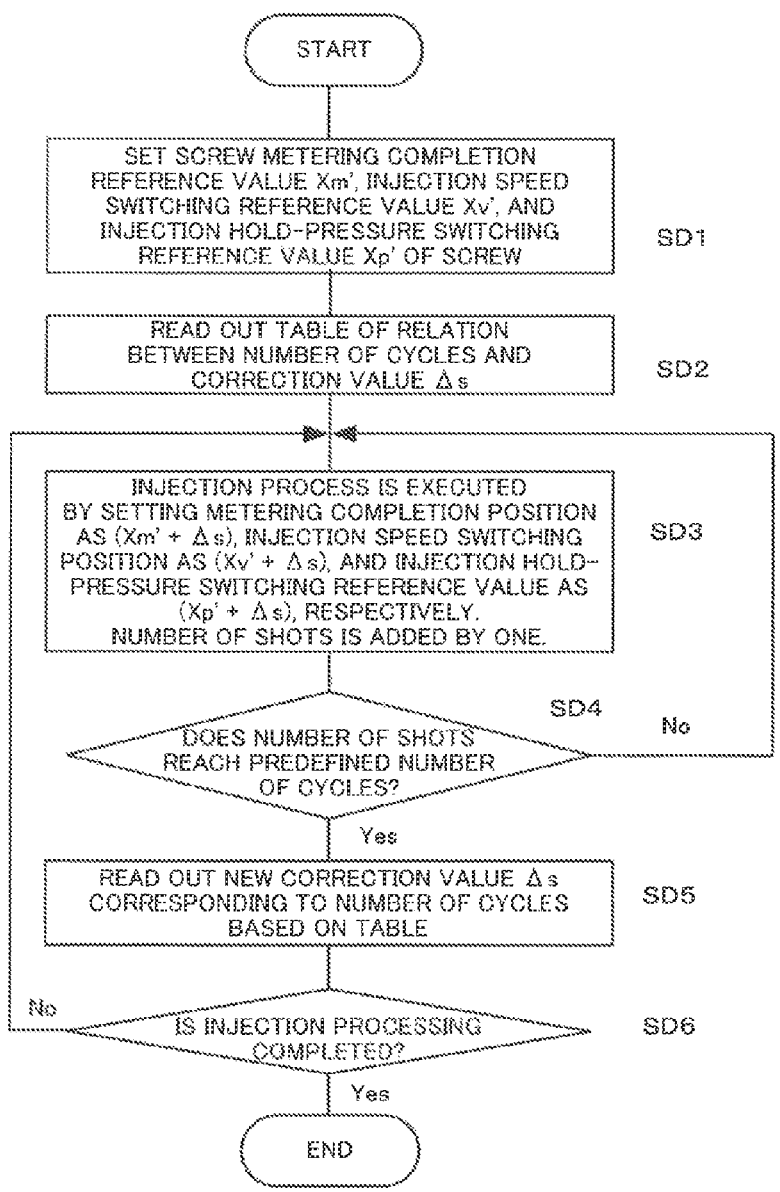
FIG. 7 is a flowchart illustrating a fourth example of correction processing of the screw process values which is executed by the controller of the injection molding machine according to the invention.

Next, a fourth example of correction processing of the screw process value will be described with reference to a flowchart of FIG. 7. In this example, the screw process values as a correction target are a metering completion reference value Xm', an injection speed switching reference value Xv', and an injection hold-pressure switching reference value Xp', a correction value Δs corresponding to the number of cycles is read out without changing these metering completion reference value Xm', injection speed switching reference value Xv', and injection hold-pressure switching reference value Xp', and the correction value Δs is each added to the metering completion reference value Xm', the injection speed switching reference value Xv', and the injection hold-pressure switching reference value Xp'. Using the values obtained by the aforementioned addition, a screw metering completion position, an injection speed switching position, and an injection hold-pressure switching position are set.

In step SD1, a screw metering completion reference value Xm' indicating a reference position of a screw metering completion, the injection speed switching reference value Xv' indicating a reference position of an injection speed switching, and the injection hold-pressure switching reference value Xp' indicating a reference position of an injection hold-pressure switching are set.

In step SD2, a table of a relation between the number of cycles and the correction value Δs is read out.

In step SD3, the metering completion position is set to a position of the screw process value (Xm'+Δs) and the injection speed switching position is set to a position of the screw process value (Xv'+Δs), and then the injection process is executed. Further, when the injection hold-pressure switching position is set to a position of the screw process value (Xp'+Δs) and the screw is moved to the position of the screw process value (Xp'+Δs), the hold pressure process is executed. Moreover, the number of shots is added by one.

In step SD4, it is determined whether or not the number of shots reaches the predetermined number of cycles which is defined in the table of step SD2. When the number of shots reaches the predetermined number of cycles (YES), the processing proceeds to step SD5; and when the number of shots does not reach the predetermined number of cycles (NO), the processing returns to step SD3.

In step SD5, the correction value Δs corresponding to the number of cycles is newly read out based on the table.

In step SD6, it is determined whether the injection process is completed or not. When the injection process is completed (YES), the processing is terminated; and when the injection process is not completed (NO), the processing returns to step SD3.

Note that the correction value Δs is a constant number in the first and second examples of correction processing of screw process values, but need not be a constant number. For example, the correction value can be obtained based on the formula stored in a storage device and be obtained by a random number.

The invention claimed is:

1. A controller of an injection molding machine,
   wherein the injection molding machine is provided with an injection member,
   the controller controls the injection molding machine to perform metering and plasticization of a resin up to a metering completion position in a metering process, to move forward the injection member while switching an injection speed at an injection speed switching position in an injection process, and to proceed to a hold pressure process when a predetermined injection hold-pressure switching condition is satisfied,
   the controller includes:
   an injection member position setting unit that sets a process value with respect to a process position of the injection member and sets the process position of the injection member according to the set process value; and
   a correction value setting unit that sets a correction value to correct the process position of the injection member, and
   the injection member position setting unit sets the metering completion position and the injection speed switching position as the process position of the injection member, at every predetermined cycle, using the correction value.

2. The controller of the injection molding machine according to claim 1, wherein the injection hold-pressure switching condition is determined based on the position of the injection member, and the injection member position setting unit further sets an injection hold-pressure switching position as the process position of the injection member, using the correction value.

3. The controller of the injection molding machine according to claim 1, wherein the injection member position setting unit reads out the correction value at every predetermined cycle and obtains a new process value by adding or subtracting the read correction value to or from the process value to set the process position of the injection member based on the new process value.

4. The controller of the injection molding machine according to claim 1, wherein the correction value setting unit sets a correction value corresponding to the number of cycles to set the process position of the injection member based on a result obtained by adding or subtracting the read correction value to or from the process value.

5. The controller of the injection molding machine according to claim 1, wherein the predetermined number of cycles is the number of cycles stored previously in a storage device or the number of cycles input from an input unit.

* * * * *